United States Patent [19]
Pruden

[11] Patent Number: 6,139,116
[45] Date of Patent: Oct. 31, 2000

[54] HUBCAP ASSEMBLY

[75] Inventor: Rick Pruden, Torrance, Calif.

[73] Assignee: American Racing Equipment, Inc., Rancho Dominquez, Calif.

[21] Appl. No.: 09/203,242

[22] Filed: Dec. 1, 1998

Related U.S. Application Data

[60] Provisional application No. 60/067,009, Dec. 1, 1997.

[51] Int. Cl.[7] .................................................. B60B 27/00
[52] U.S. Cl. ...................................... 301/108.1; 301/37.1
[58] Field of Search ................................ 301/37.1, 37.31, 301/37.42, 37.21, 108.1, 108.3; D12/135, 204, 205

[56] References Cited

U.S. PATENT DOCUMENTS

| | | |
|---|---|---|
| 248,066 | 10/1881 | Swift . |
| 681,966 | 9/1901 | Knipe . |
| 1,766,313 | 6/1930 | Stokes . |
| 1,776,641 | 9/1930 | Smith . |
| 2,015,352 | 9/1935 | Reid ........................................ 301/108.3 |
| 3,393,015 | 7/1968 | Kaufman ................................ 301/108.1 |
| 3,397,918 | 8/1968 | Aske, Jr. et al. ...................... 301/37.42 |
| 3,598,450 | 8/1971 | Brown et al. ............................. 301/108 |
| 3,860,295 | 1/1975 | Beisch ......................................... 301/37 |
| 4,070,066 | 1/1978 | Reppert et al. ......................... 301/36.1 |
| 4,073,540 | 2/1978 | Jackowski ................................ 301/108 |
| 4,270,805 | 6/1981 | Spisak ........................................ 301/37 |
| 4,682,820 | 7/1987 | Stalter ............................... 301/108.1 X |
| 4,943,122 | 7/1990 | Nakamura ................................ 301/108 |
| 5,112,112 | 5/1992 | Baba ..................................... 301/108.3 |
| 5,192,117 | 3/1993 | Kuck ....................................... 301/108 |
| 5,205,617 | 4/1993 | Hoffman ................................. 301/108 |
| 5,380,103 | 1/1995 | Lederman ............................... 384/489 |
| 5,505,525 | 4/1996 | Denton .................................... 301/108 |
| 5,551,530 | 9/1996 | Goetker .................................. 184/45.2 |
| 5,664,846 | 9/1997 | Kuck ....................................... 301/108 |

*Primary Examiner*—S. Joseph Morano
*Assistant Examiner*—Jason R. Bellinger
*Attorney, Agent, or Firm*—Thompson Hine & Flory LLP

[57] ABSTRACT

A hubcap assembly that includes a push-through hubcap having a resilient member disposed on its external surface to maintain a tight fit engagement between the hubcap and a hub bore of an associated wheel. The hubcap assembly of the present invention decreases the potential for the hubcap to become loose and move within the hub bore, thus decreasing the potential for the hubcap to rattle within the hub bore.

26 Claims, 2 Drawing Sheets

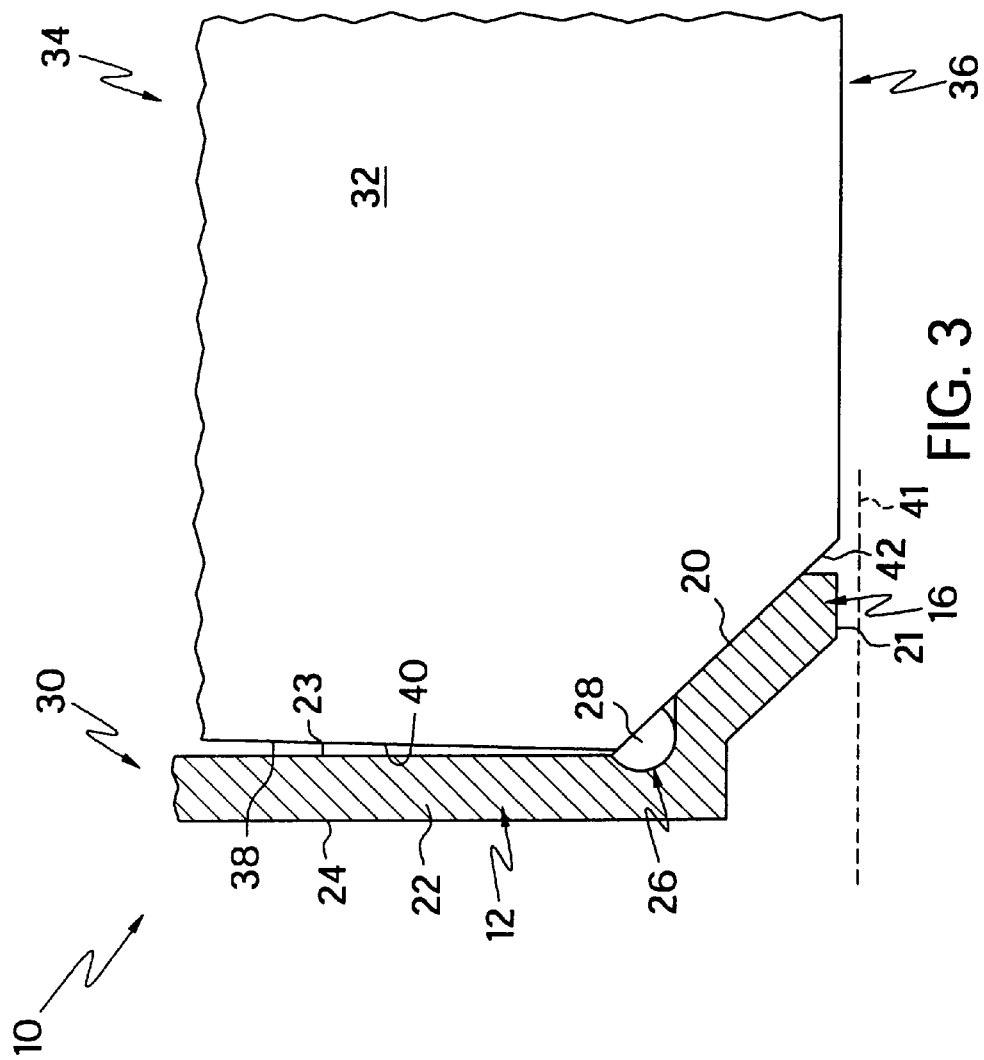

HUBCAP ASSEMBLY

CROSS-REFERENCE TO RELATED APPLICATIONS

This application claims priority from U.S. Provisional Application No. 60/067,009 filed Dec. 1, 1997.

BACKGROUND OF THE INVENTION

The present invention relates to hubcaps for wheels, and more particularly, to hubcap assemblies for automotive vehicle wheels.

Push-through hubcaps—hubcaps which are inserted into hub bores of wheels from the back side of a wheel—are generally known in the art. Typical push-through hubcaps are generally decorative in nature and are usually made of a relatively light synthetic resin material, such as plastic. A problem associated with such push-through hubcaps is that the fit between the main body of the cap and the hub bore can be loose, or can loosen over time, allowing the hubcap to move within the bore. In either case, though, this movement has a tendency to produce an undesirable rattling noise during rotation of the associated wheel.

In general, the reason for an initially loose fit is that the hubcaps are designed to have a clearance fit within the wheel bore rather than a friction fit. As a result of this clearance fitting, minor dimensional discrepancies between different wheels and the associated hubcaps can result in the fit of some hubcaps being somewhat looser than others when they are mounted on a wheel.

The reason for such looseness which occurs over time is somewhat more complex. The resin material from which most hubcaps are fabricated has a tendency to shrink when exposed to heat. Since these hubcaps are disposed in the hub bore of an automobile wheel, they are often exposed to a great deal of radiant and kinetic heat. During normal conditions, the shrinkage of the hubcap due to this heat is relatively negligible and poses few problems. However, when the hubcap is subjected to extreme heat due to exposure to direct radiant sunlight or extended rotation at high rates of speed, the hubcap shrinkage may reach a point where it becomes problematic. This, shrinkage causes the hubcap to pull away from the wall of the hub bore, thus loosening the engagement between the hubcap and the hub bore.

Accordingly, there is a need for a push-through hubcap assembly that overcomes some of the above identified deficiencies associated with conventional push-through hubcaps, that maintains a tight fit engagement with an associated hub bore, that prevents the rattling noise associated with conventional push-through hubcaps, and that is cost efficient to manufacture.

SUMMARY OF THE INVENTION

The present invention provides a push-through hubcap assembly which overcomes some of the deficiencies of prior art push-through hubcaps by including a resilient member between the body of the hubcap and the hub bore of an associated wheel. It has been found that by using a resilient member in accordance with the present invention, a tight fit between the hub cap and the hub bore is able to be maintained even when the hubcap shrinks due to exposure to radiant and kinetic heat.

The hubcap assembly of the present invention includes a wheel having a central hub bore and an associated push-through hubcap. Preferably, the hub bore is annular in shape and includes an inner annular surface for engaging a flange on an associated push-through hubcap. The push-through hubcap preferably is composed of an annular body having a flange disposed at the bottom thereof. Preferably, a chamfer is formed on the inner annular surface of the hub bore for engaging the flange on the hubcap body and the flange includes an annular channel formed around the top edge thereof for receiving a resilient member. Thus, when the hubcap is inserted into the hub bore, the resilient member engages the chamfer of the inner annular surface and maintains the hubcap in a tight fit engagement with the hub bore, thereby maintaining a snug fit and preventing rattling of the hubcap, even when the hubcap shrinks from heat exposure. In a preferred embodiment, the hubcap assembly of the present invention is assembled by inserting the hubcap body through the hub bore of the associated wheel such that the resilient member engages and is biased against the chamfered inner surface of the bore.

Accordingly, it is an object of the present invention to provide a push-through hubcap which includes a resilient member on its external surface to maintain a tight fit engagement between the hubcap and the hub bore of an associated wheel; a push-through hubcap assembly which decreases the potential for the hubcap to become loose and move within the hub bore, thus decreasing the potential for the hubcap to rattle within the hub bore; a push-through hubcap assembly which is cost efficient to manufacture; and a method for assembling a hubcap and wheel wherein the push-through hubcap has a significantly reduced potential for rattling within a hub bore of an associated wheel.

Other objects and advantages of the invention will be apparent from the following description, the accompanying drawing and the appended claims.

BRIEF DESCRIPTION OF THE DRAWINGS

FIG. 3 is a detail in section of the hubcap of FIG. 1, mounted in the hub bore of an associated wheel.

DETAILED DESCRIPTION

The term "push-through hubcap" is used to describe a hubcap which is shaped to be inserted into a hub bore of a wheel from the inside (inboard side) of a wheel prior to mounting the wheel on a hub of an associated vehicle. The push-through hubcap is inserted into the hub bore of the wheel so that a face of the hubcap is visible from the outside (outboard) side of the wheel.

Figure 1:
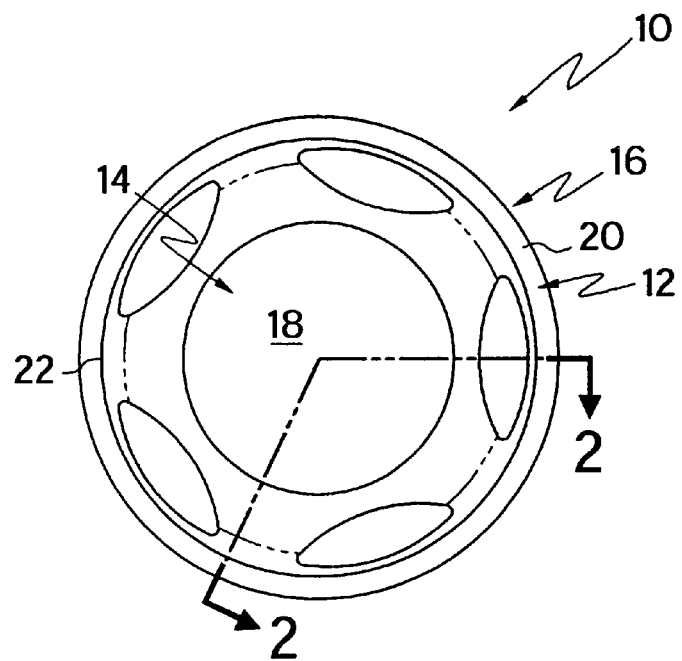
FIG. 1 is a top plan view of a preferred embodiment of the push-through hubcap of the present invention.
Figure 2:
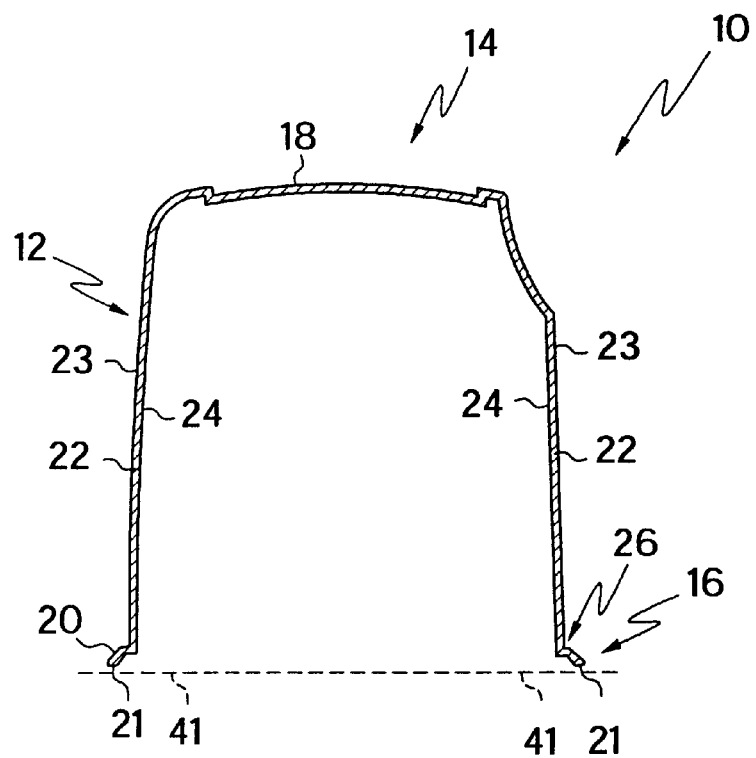
FIG. 2 is a cross section taken at line 2—2 of FIG. 1.

As best shown in FIGS. 1 and 2, in accordance with a preferred embodiment of the present invention, a push-through hubcap, generally designated 10, includes a cup-shaped body generally designated 12. In a preferred embodiment, the body 12 is made of plastic, or more specifically plateable ABS. However, those skilled in the art will appreciate that other suitable materials can be used without departing from the scope of the invention. The body 12 includes an outboard end 14 and an inboard end 16. The outboard end 14 includes a spherical face 18 and the inboard end 16 includes a radially outwardly flared annular flange 20 having a lower surface 21 to fix the position of the body 12 within a hub bore relative to an associated wheel. Those skilled in the art will appreciate that other structures, such as spaced projections, could be used to prevent axial outward movement of the hubcap 10 and these structures are considered to be within the scope of the present invention.

The body 12 includes an outwardly tapered, cylindrical wall 22 having an annular outer surface 23 and an annular inner surface 24. The taper facilitates the insertion of the hubcap 10 into an associated hub bore. It is desirable that the hubcap 10 be shaped to slide freely into an associated hub bore. Therefore, the largest outer diameter of the wall 22 is preferably less than the outer diameter of an associated hub bores so that the hubcap 10 can be substantially received within the hub bore.

As best shown in FIG. 3, the body 12 includes an annular channel 26, and the hubcap 10 includes a resilient member 28, preferably an O-ring, shaped to fit within the channel. Preferably, the O-ring is made of a resilient material, such as rubber, or the like. The purpose of the O-ring is to maintain a tight fit engagement between the hubcap 10 and an associated wheel. Such a tight fit engagement prevents rattling and vibration of the hubcap 10 within the wheel. The annular channel 26 is positioned in proximity to the inboard end 16, preferably at the transition point between the outer wall 22 of the body 12 and the annular flange 20 to receive the resilient member 28.

The push-through hubcap 10 can be used to form a hubcap assembly, generally designated 30, shown in FIG. 3. The hubcap assembly 30 of the present invention includes the push-through hubcap 10 and a wheel, generally designated 32. The wheel 32 includes an outboard side 34, an inboard side 36, and a hub bore 38. The hub bore 38 extends through the center of the wheel 32 and includes an outer diameter defined by an inner annular surface 40 which preferably includes an inner annular chamfer 42. The dimensions of the outer diameter of the hub bore 38 are sized such that a hubcap 10 can be inserted into the hub bore 38. Preferably, when the hubcap 10 is positioned within the hub bore 38, the flange 20 and resilient member 28 securely engage the inner annular chamfer 42 around the entire circumference of the hubcap 10, thereby restricting both radial and axial outward movement of the hubcap 10 within the hub bore 38. In an alternate embodiment, the resilient member 28 is positioned farther out on the body 12 so that it engages the inner annular surface 40 of the wheel 32 outboard of the inner annular chamfer 42.

The hubcap 10 of the present invention is inserted into the hub bore 38 from the inboard side 36 of the wheel 32. The employment of the flange 20 with the wheel 32 acts as a stop, which positions the hubcap 10 relative to the hub bore 38. Preferably, the lower surface 21 of the flange 20 is shaped to engage a surface of a brake drum or rotor 41 so that when the wheel 32 is bolted to a hub (not shown), the lower surface 21 of the flange 20 engages the caliper 41 thereby preventing the hubcap 10 from sliding in an inboard direction. Preferably, the flange 20 of the hubcap 10 is also shaped to engage the chamfer 42 of the annular surface 40. More preferably, the resilient member 28 engages the chamfer 42 of the annular surface 40 such that the hubcap 10 is held in tight fit engagement with the hub bore 38 and its associated wheel 32. In a preferred embodiment, the cylindrical wall 22 is not in contact with the annular surface 40 of the hub bore 38 once the hubcap 10 is received by the hub bore 38.

The method of assembling the hubcap assembly 30 of the present invention is as follows. A wheel 32 having a hub bore 38 extending through a central axis thereof is selected. Preferably, the hub bore 38 of the wheel 32 includes an outer diameter that is defined by an annular surface 40 having a an annular chamfer 42 on a lower portion thereof. Next, a push-through hubcap 10 having a body 12 which is capable of being received by the hub bore 38 is selected. Preferably, the body 12 of the hubcap 10 further includes a resilient member 28 positioned thereon that is capable of engaging the annular chamfer 42 of the hub bore 38. Finally, the push-through hubcap 10 is inserted through the hub bore 38 such that the resilient member 28 engages the annular chamfer 42 of the hub bore 38. In a preferred embodiment, the lower surface 21 of the flange 20 is pressed flush against a brake pad or caliper 41 when the wheel 32 is bolted to an associated hub (not shown), thereby preventing inboard movement of the hubcap 10.

Having described the invention in detail and by reference to the drawings, it will be apparent that modifications and variations are possible without departing from the scope of the invention as defined in the following claims.

What is claimed is:

1. A hubcap and wheel assembly comprising:
    a wheel having a hub bore extending through a center thereof, said hub bore including an inner annular surface; and
    a push-through hubcap having a body positioned within said hub bore, said body including a resilient member which engages said annular surface of said hub bore and an annular channel shaped to receive said resilient member, such that movement of said body within said bore is minimized.

2. The hubcap and wheel assembly of claim 1 wherein said body is cup-shaped and includes inboard and outboard ends, said outboard end including a front face, and said inboard end including a flange.

3. The hubcap and wheel assembly of claim 2 wherein said flange engages said wheel to fix said hubcap relative to said wheel.

4. The hubcap and wheel assembly of claim 3 wherein said flange extends radially outward from said hubcap.

5. The hubcap and wheel assembly of claim 4 wherein said flange is annular.

6. The hubcap assembly of claim 5 wherein said annular surface of said hub bore includes a chamfer portion which engages said flange.

7. The hubcap and wheel assembly of claim 6 wherein said annular channel is located at said inboard end of said body.

8. The hubcap and wheel assembly of claim 7 wherein said annular channel is located at a transition point between said body and said flange.

9. The hubcap and wheel assembly of claim 2 wherein said body includes a cylindrical wall which converges from said second end to said first end.

10. The hubcap and wheel assembly of claim 1 wherein said hubcap is made of plastic material.

11. The hubcap and wheel assembly of claim 1 wherein said resilient member is an O-ring.

12. A hubcap and wheel assembly comprising:
    a wheel having a hub bore extending through a center thereof and including an inner annular surface; and
    a push-through hubcap having a cup-shaped body and inboard and outboard ends, said outboard end including a front face, and said inboard end including an annular flange wherein said annular flange of said body engages a chamfer of said annular surface of said hub bore to locate said hubcap relative to said wheel, said body further including an annular channel located at a transition point between said body and said annular flange and a resilient member received within said annular channel, said body being received within said hub bore such that said resilient member engages said chamfer portion of said annular surface.

13. A method for assembling a hubcap and wheel assembly comprising the steps of:
   selecting a wheel having a hub bore extending through- a center thereof including an inner annular surface;
   selecting-a push-through hubcap having a body shaped to fit within said hub bore, said body including a resilient member positioned in an annular channel for receiving said resilient member to engage said inner annular surface; and
   inserting said push-through hubcap through said hub bore such that said resilient member engages said annular surface of said hub bore.

14. The method of claim 13 wherein said push-through hubcap selecting step includes the step of selecting a push-through hubcap having a body that is cup-shaped and includes inboard and outboard ends, said outboard end including a front face, and said inboard end including a protrusion.

15. The method of claim 14 wherein said push-through hubcap selecting step includes the step of selecting a push-through hubcap wherein said protrusion of said body engages said wheel to locate said hubcap relative to said wheel.

16. The method of claim 15 wherein said push-through hubcap selecting step includes the step of selecting a push-through hubcap wherein said protrusion is a flange.

17. The method of claim 16 wherein said push-through hubcap selecting step includes the step of selecting a push-through hubcap wherein said flange is an annular flange.

18. The method of claim 17 wherein said wheel selecting step includes the step of selecting a wheel wherein said annular surface of said hub bore includes a chamfer which engages said annular flange.

19. The method of claim 18 wherein said push-through hubcap selecting step includes the step of selecting a push-through hubcap wherein said annular channel is located adjacent to said inboard end of said body.

20. The method of claim 19 wherein said push-through hubcap selecting step includes the step of selecting a push-through hubcap wherein said annular channel is located at a transition point between said body and said flange.

21. The method of claim 14 wherein said push-through hubcap selecting step includes the step of selecting a push-through hubcap wherein said body includes a cylindrical wall which converges from said second end to said first end.

22. The method of claim 13 wherein said push-through hubcap selecting step includes the step of selecting a push-through hubcap wherein said hubcap is made of plastic.

23. The method of claim 14 wherein said push-through hubcap selecting step includes the step of selecting a push-through hubcap wherein said resilient member is an O-ring.

24. A method for assembling a hubcap and wheel assembly comprising the steps of:
   selecting a wheel having a hub bore extending through a central axis thereof including an annular surface;
   selecting a push-through hubcap having a body which is capable of being received by said hub bore, said body being cup-shaped and including inboard and outboard ends, said outboard end including a front face, and said inboard end including an annular flange, wherein said annular flange of said body engages a chamfer formed in said annular surface of said hub bore such that said hubcap is fixed relative to said wheel, said body further including an annular channel located at a transition point between said body and said annular flange which is shaped to receive said resilient member such that said resilient member is capable of engaging said chamfer of said annular surface;
   inserting said push-through hubcap into said hub bore such that said resilient member engages said chamfer of said annular surface.

25. The hubcap and wheel assembly of claim 2 wherein said flange includes a lower surface shaped to engage a surface of a brake rotor or drum.

26. The method of claim 14 wherein said push-through hubcap selecting step includes the step of selecting a push-through hubcap wherein said protrusion includes a lower surface shaped to engage a surface of a brake rotor or drum.

* * * * *